(12) United States Patent
Gray

(10) Patent No.: US 7,056,083 B2
(45) Date of Patent: Jun. 6, 2006

(54) IMPINGEMENT COOLING OF GAS TURBINE BLADES OR VANES

(75) Inventor: Christopher Gray, Graz (AT)

(73) Assignee: Alstom (Switzerland) LTD, Baden (CH)

( * ) Notice: Subject to any disclaimer, the term of this patent is extended or adjusted under 35 U.S.C. 154(b) by 0 days.

(21) Appl. No.: 10/509,171

(22) PCT Filed: Mar. 27, 2003

(86) PCT No.: PCT/GB03/01321

§ 371 (c)(1),
(2), (4) Date: May 9, 2005

(87) PCT Pub. No.: WO03/083267

PCT Pub. Date: Oct. 9, 2003

(65) Prior Publication Data

US 2005/0220626 A1    Oct. 6, 2005

(30) Foreign Application Priority Data

Mar. 27, 2002   (GB)   ................. 0207171.0

(51) Int. Cl.
*F01D 9/06* (2006.01)
*F01D 15/18* (2006.01)

(52) U.S. Cl. .................... 415/115; 416/96 A; 416/97 R

(58) Field of Classification Search ............... 415/115, 415/116; 416/96 R, 96 A, 97 R
See application file for complete search history.

(56) References Cited

U.S. PATENT DOCUMENTS

| 2,847,185 | A | | 8/1958 | Petrie et al. |
| 3,373,970 | A | * | 3/1968 | Brockmann ............... 416/96 A |
| 4,312,624 | A | | 1/1982 | Steinbauer, Jr. et al. |
| 4,798,515 | A | | 1/1989 | Hsia et al. |
| 6,468,031 | B1 | * | 10/2002 | Yu et al. ..................... 415/115 |
| 6,582,186 | B1 | * | 6/2003 | Manzoori et al. ......... 416/96 A |

FOREIGN PATENT DOCUMENTS

| DE | 20 65 334 | | 4/1973 |
| EP | 0 990 771 A1 | | 4/2000 |
| EP | 1 149 982 A2 | | 10/2001 |
| JP | 61-49102 A | * | 3/1986 ............... 416/97 R |
| JP | 61 118504 | | 6/1986 |

* cited by examiner

*Primary Examiner*—Christopher Verdier

(57) ABSTRACT

A turbine blade or vane comprises an impingement tube located generally in a radial direction within the blade or vane aerofoil, the impingement tube comprising two parts, extending into the blade or vane from opposite radial ends thereof and locating against a specially formed rib which extends generally chordwise around the leading edge of the aerofoil.

6 Claims, 2 Drawing Sheets

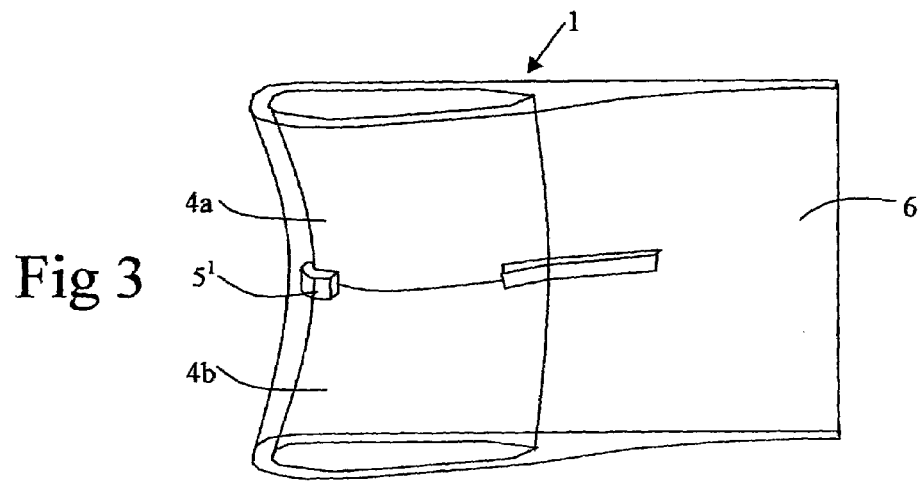
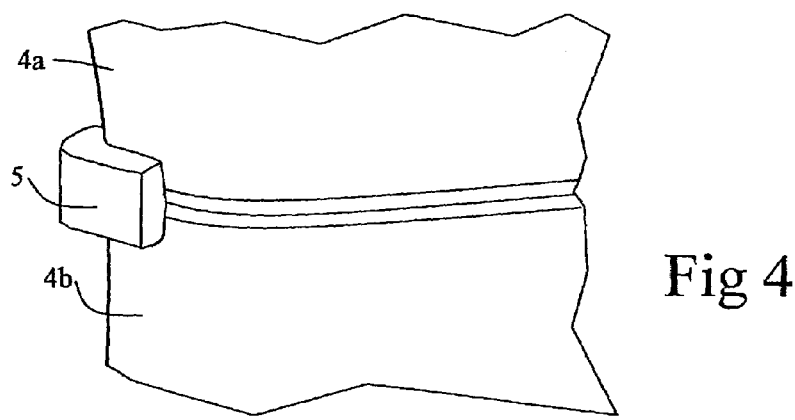
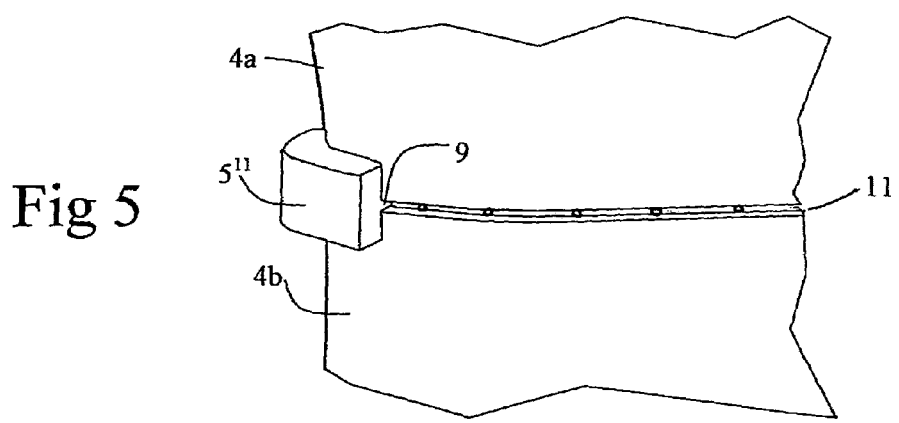

IMPINGEMENT COOLING OF GAS TURBINE BLADES OR VANES

CROSS REFERENCE TO RELATED APPLICATION

This application is the US National Stage of International Application No. PCT/GB03/01321, filed Mar. 27, 2003 and claims the benefit thereof. The International Application claims the benefits of British Patent application No. 0207171.0 GB filed Mar. 27, 2002, both of the applications are incorporated by reference herein in their entirety.

FIELD OF THE INVENTION

The present invention relates to aerofoil-shaped gas turbine components such as rotor blades and stator vanes, and to impingement tubes used in such components for cooling purposes.

BACKGROUND TO THE INVENTION

Modern gas turbines often operate at extremely high temperatures. The effect on the turbine blades and/or stator vanes can be detrimental to the efficient operation of the turbine and can, in extreme circumstances, lead to distortion and possible failure of the blade or vane. In order to overcome this risk, high temperature turbines may include hollow blades or vanes incorporating so-called impingement tubes. These are hollow tubes that run radially within the blades or vanes. Cooling air is forced into and along these tubes and emerges through suitable apertures into the void between the tubes and the inner surfaces of the hollow blades or vanes. Air expelled from the apertures impinges on the inner surfaces of the hollow blades or vanes (so-called "impingement cooling") and also creates an internal airflow to cool the blade or vane.

Normally, blades and vanes are made by casting. Impingement tubes may be inserted into the hollow structure from one or the other end and welded or otherwise fixed in place. Chordwise extending ribs are also often cast inside the blades, mainly to direct coolant and to provide a greater cooling surface area. These ribs, or selected of them, may serve as location spacers for the impingement tubes, so as to create the necessary internal space for the cooling air.

Problems arise with fitting impingement tubes into the latest generation of blades or vanes in that the aerofoil sections of the blades or vanes may be extremely complicated. Hollow aerofoils may feature multidirectional curvature. In some designs, the mid-section may actually be smaller than either the tip or hub sections. A technique for enabling an impingement tube to be fitted inside such a hollow turbine blade or vane is therefore a necessity.

SUMMARY OF THE INVENTION

Accordingly, the present invention provides a turbine component comprising a hollow aerofoil, a chordwise extending rib provided on the interior surface of the hollow aero-foil, and an impingement tube within the aerofoil, the impingement tube being formed as two separate sections that extend spanwise through the aerofoil and have confronting ends that both locate on the rib.

A plurality of chordwise extending ribs may be provided on the interior surface of the hollow aerofoil, additional to the rib that locates the confronting ends of the impingement tube sections.

The rib that locates the confronting ends of the impingement tube sections may be discontinuous. It may have a chevron-shaped cross-section thereby to engage the said adjacent ends of the sections of the impingement tube, which may be bevelled in a complementary way to the chevron-shaped rib. Alternatively, the rib may have a lip-shaped cross-section, thereby to engage the adjacent-ends of the sections of the impingement tube.

At least one of the adjacent ends of the sections of the impingement tube may have an end wall there-across. Apertures may be provided in or adjacent to the or each end wall to allow cooling air to exit the sections and cool the inner surface of the blade or vane near the mid-height region thereof.

BRIEF DESCRIPTION OF THE DRAWINGS

The present invention will be described with reference to the drawings, in which:

FIG. 3 is a phantom drawing showing the location of a two-part impingement tube inside a hollow blade or vane;

FIG. 4 is an enlarged view of part of FIG. 3, showing cross-sectional detail of an internal chordal rib; and FIG. 5 is a view similar to FIG. 4, but showing an alternative form of rib.

DETAILED DESCRIPTION OF THE INVENTION

In the present description, reference will only be made to blades, for the sake of simplicity, but it is to be understood that the invention is applicable to both blades and vanes of a turbine. The skilled person will appreciate that airways can be provided to the interior of either stator vanes or rotor blades for the purpose of air-cooling.

Figure 1:
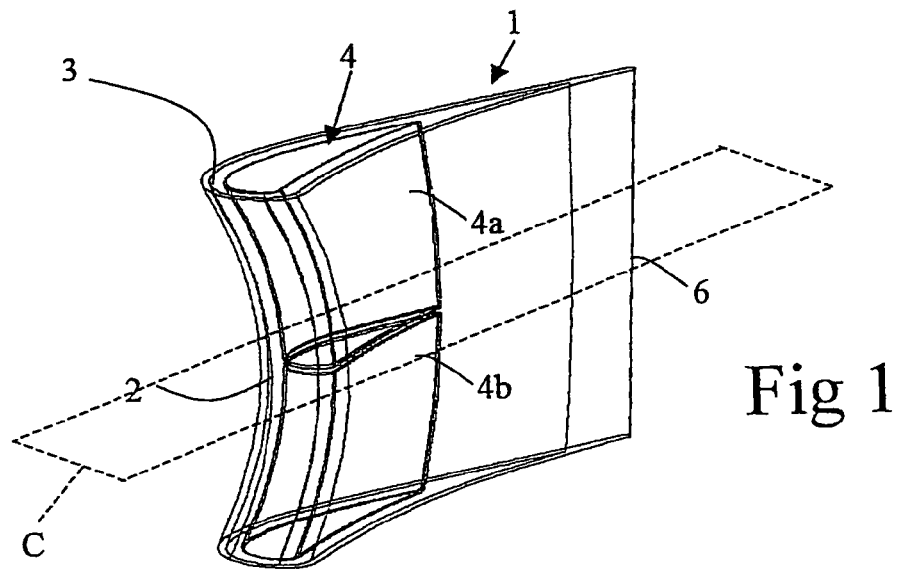
FIG. 1 is a perspective wire-frame view of the aerofoil of a hollow turbine blade or vane.

As shown in FIG. 1, a blade 1, of which only the aerofoil portion is shown, has a complexly curved external aerofoil section for increased aerodynamic efficiency in use. The leading edge 2 is also curved, possibly in multiple directions. The blade is cast, as is well known in the art, so as to have a hollow interior 3. An impingement tube, indicated generally by the arrow 4, is inserted into the hollow aerofoil for the express purpose of providing a conduit for cooling air. In accordance with the invention, the impingement tube is shown split into two Portions 4a, 4b in a chordal plane C located at about the mid-point of the blade's span.

Figure 2:
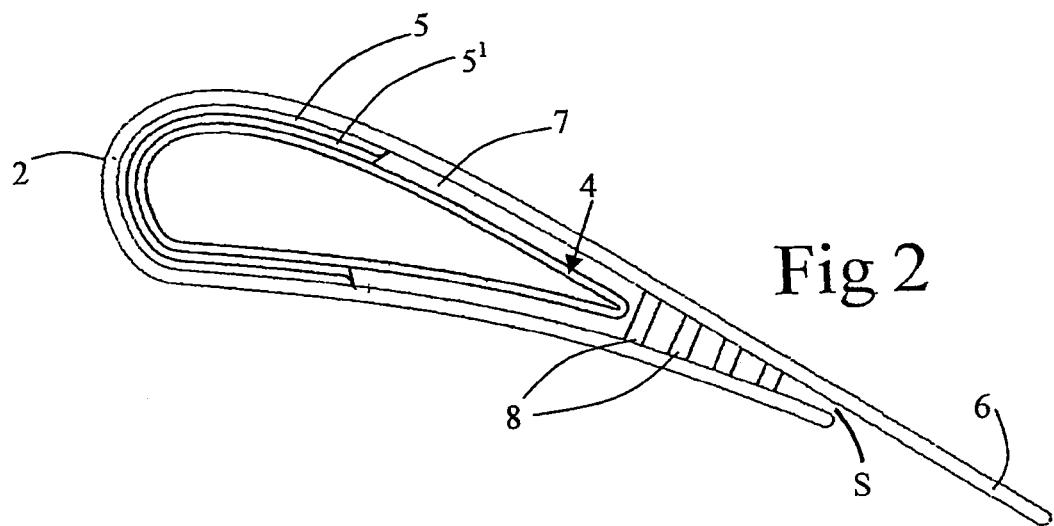
FIG. 2 is a chordal cross-section through FIG. 1 to show the spacing of an impingement tube from the inner surface of the blade or vane.

As shown in FIG. 2, the blade is preferably cast with internal ribs 5 extending in the general direction of chords of the aerofoil. In this case, the ribs extend around the leading edge 2 of the aerofoil. Although only one rib 5 is shown in this sectional view, there are usually several ribs radially spaced apart over the span of the blade and the provision of more than one such rib will be assumed during the remainder of this description. The advantage of this is that the ribs provide additional cooling surface area and may seem to guide the cooling air exiting from small holes (not shown) in the impingement tube towards the more heat-critical surfaces of the blade. Eventually, the spent coolant passes from the blade into the surrounding freestream through film cooling holes, slots or other apertures 11, as known in the art.

Some of these may be provided in the trailing edge 6 of the blade, and in fact FIG. 2 shows the aerofoil as provided with a trailing edge slot S.

The ribs 5 create an internal space 7 between the inner surface of the blade and the outer surface of the impingement tube, enabling cooling air to be exhausted from the impingement tube 4 through the small holes therein, as known. In the case of rotor blades, cooling air can be brought through the hub or disc and into the impingement tube from the radially innermost end. In the case of stator vanes, cooling air can be brought from one or other or both radial ends of the vane into the impingement tube 4.

The impingement tube 4 is split into two sections 4a and 4b to make possible its insertion into the interior of the blade, because the tube 4 and the aerofoil with which it co-operates have a substantially smaller cross-sectional area at mid-height than at their radially opposed ends. Each section is inserted from a respective radial end of the blade towards the middle region of the blade height, height being measured in a radial sense from the innermost to the outermost radial extent of the blade.

As shown in FIG. 2, the ribs 5 extend towards but do not touch the exterior of the impingement tube 4. However, a further rib $5^1$ at or near the middle height region of the blade is sized to bridge the gap between the interior surface of the blade and the impingement tube, and thereby locates the adjacent ends of the impingement tube sections 4a, 4b. As shown in FIG. 4, the side of the rib $5^1$ facing towards the impingement tube may be configured to enhance the ability of the rib to locate the impingement tube sections. In its preferred form, the rib $5^1$ is chevron-shaped 10 on the side facing the impingement tube to provide a more positive location, e.g., an interference fit, for the adjacent ends of the sections of the impingement tube. Optionally, the confronting ends of the two tube sections 4a, 4b may be bevelled in a complementary way to the chevron-shaped 10 rib.

Alternatively, as shown in FIG. 5, a rib $5^{11}$ may be formed to have a laterally projecting lip 9, against whose opposing sides the plain ends of the two tube sections 4a, 4b are seated.

The adjacent ends of the two tube sections 4a, 4b may confront each other across a small gap (FIGS. 1 and 5), or alternatively abut each other along a chordal line, which in FIG. 4 is defined by the apex of the chevron shape 10 of the rib $5^1$.

Once inserted into the blade, the tube section 4a can be welded or otherwise fixed in place at its radially outer end tube section 4b can be similarly fixed at its radially inner end. The depth of insertion of the impingement tube sections, and hence whether their inner ends abut or not, can be controlled accurately, e.g., by adjusting the dimensions of the weld beads and/or the shaped rib $5^1$ or $5^{11}$. In addition, the shaped rib can be arranged either to minimise leakage of cooling air through the gap (if present) between the adjacent ends of the impingement tube sections or, alternatively, by suitable design, can provide a predetermined flow of cooling air into the space between the ends of the impingement tube sections. For example, to minimise leakage through a gap as aforementioned, the rib $5^1$ can be continuous over at least a substantial portion of the inner surface of the blade, so as to blank off the gap it covers; alternatively, the rib can be discontinuous as shown in FIG. 3, to allow more cooling air flow.

One or both of the adjacent ends of the impingement tube sections can be closed and cooling can be enhanced by providing apertures 11 in or adjacent to the ends of the impingement tube sections to allow air to emerge from within the impingement tube sections and cool the inner wall of the blade. While it may be sufficient for these apertures 11 to be normal to the ends, it may be preferable to provide the sections with thicker material at the base so as to allow the apertures 11 to be angled, thereby causing air exiting from them to impinge on a predetermined part of the inner wall of the blade for greater cooling efficiency.

Alternatively to the last Paragraph, the impingement tube sections may be provided with stamped closed ends defining profiled holes at appropriate angles. The direction of holes in the bases should be arranged so that air from the base of one impingement tube section is not directed straight at the holes in the base of the other impingement tube section.

The impingement tube sections may otherwise be provided with features as normally provided in one-piece impingement tubes, such as an may of small diameter holes concentrated near the leading edge thereof. The aerofoil section itself may similarly be provided with known features, such as film holes in the leading and trailing edges to allow air to exit the blade into the external boundary layer and the freestream respectively, and pedestals 8 in the trailing edge to enhance heat transfer.

The invention claimed is:

1. A turbine component, comprising:
   a hollow aerofoil;
   a chordwise extending rib arranged on the interior surface of the hollow aerofoil;
   a first impingement tube portion; and
   a second impingement tube portion,
   wherein,
   the first impingement tube portion and the second impingement tube portion extend spanwise through the aerofoil and have confronting ends near the rib,
   the rib has a chevron-shaped cross-section thereby to engage the confronting ends of the first and second impingement tube portions and the confronting ends of the impingement tube portions are bevelled in a complementary way to the chevron-shaped rib.

2. The turbine component according to claim 1, wherein the turbine component is a blade or vane.

3. The turbine component according to claim 1, wherein a plurality of chordwise extending ribs are arranged near the interior surface of the hollow aerofoil and are provided in addition to the rib that locates the confronting ends of the first and second impingement tube portions.

4. The turbine component according to claim 1, wherein the rib that locates the confronting ends of the first and second impingement tube portions is discontinuous.

5. The turbine component according to claim 1, wherein at least one of the confronting ends of the first and second impingement tube portions has an end wall there-across.

6. The turbine component according to claim 5, wherein apertures are provided in or adjacent to the or each end wall allowing cooling air to exit the apertures between the first impingement tube portion and second impingement tube portion and impinge on the inner surface of a blade or vane near the mid-height region thereof.

* * * * *